UNITED STATES PATENT OFFICE 2,338,076

ETHER ESTERS OF DIETHYLSTILBOESTROL

Bernard J. Ludwig, Bloomfield, N. J., assignor to Wallace & Tiernan Products, Inc., Belleville, N. J., a corporation of New Jersey No Drawing. Application March 15, 1941, Serial No. 383,545

12 Claims. (Cl. 260—479)

This invention relates to ether-esters of diphenols and to methods of preparing them. In particular, the invention relates to medicinal compositions including ester derivatives of dialkyl-stilboestrol mono ethers, and similar compounds.

Monoesters of monoalkyl ethers of certain diphenols are adapted particularly for producing physiological effects of a female sex hormone. The invention will be illustrated therefore, by description of monoesters of monoalkyl ethers characterized by estrogenic potency.

Considerable research has been carried out on the preparation of synthetic substances with properties resembling those of the natural female sex hormone, oestrin. There have been made and sold for this purpose, for instance, diethylstilboestrol, which is alpha, beta, diethyl 4,4'-dihydroxy stilbene, and the diacyl derivative, diethylstilboestrol dipropionate, which is alpha, beta diethyl 4,4'dipropionoxy stilbene. These compounds when used in amounts sufficient to cause oestrus, frequently produce undesirable manifestations. In many instances, their use is accompanied or followed by symptoms varying from nausea and headache to continuous vomiting and complete gastric intolerance. In addition to these undesirable toxic effects, it is not always feasible to control the extent or duration of the physiological effect desired by the use of diethylstilboestrol or diethylstilboestrol dipropionate.

It is, therefore, an object of this invention to provide a substance of satisfactory oestrogenic potency which does not possess the toxicity of diethylstilboestrol or diethylstilboestrol dipropionate.

A further object is to provide a medicinal adapted to produce the desired oestrogenic properties for a period of time that can be regulated by the dosage of the material. These and such other objects of the invention as appear from the detailed description that follows are obtained by means of the composition and method described.

In brief, this invention comprises monocarboxylic acid acyl derivatives of dialkylstilboestrol monoalkyl ethers. The invention comprises also the method of making such derivatives and therapeutic agents comprising them.

The general relationship of this new class of compounds to dialkylstilboestrol and to stilboestrol dipropionate will be evident from an examination of the formulae which may be used to represent the related compounds.

Diethylstilboestrol, for instance, is usually represented by Formula A

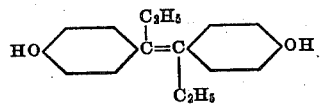

Diethylstilboestrol dipropionate may be represented by the Formula B

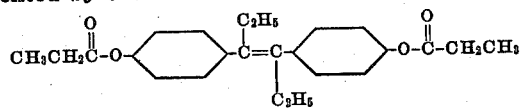

While diethylstilboestrol monomethyl ether is commonly represented by Formula C

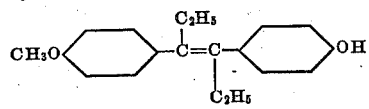

The new monocarboxylic acid acyl derivatives of dialkylstilboestrol monoalkyl ether may be represented by the Formula D

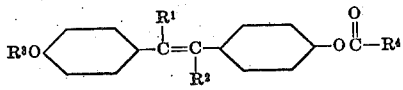

In the formula D, $R^1$ and $R^2$ represent alkyl groups, $R^3$ and $R^4$ a monovalent alkyl radical, suitably a primary alkyl group, although branched chain, secondary, cyclic, and either saturated or unsaturated alkyl groups may be used.

It will be observed that the compounds represented by the fourth formula differ from diethylstilboestrol in the substitution of an alkyl group ($R^3$) for one hydrogen atom. A second difference is the replacement of the ethyl groups in the alpha and beta positions in diethylstilboestrol by alkyl groups $R^1$ and $R^2$ that may or may not be the ethyl group. A third difference is the substitution of an acyl group

for one hydrogen atom.

When the monocarboxylic acid acyl derivatives of monoalkyl ethers of the type Formula D are to be used to give maximum oestrogenic effect, then $R^1$ and $R^2$ should be ethyl. $R^3$ and $R^4$ should be short chain alkyl radicles, containing from 1 to 7 carbon atoms, if it is desired to produce the oestrogenic effect with as small a dose as possible. However, this may not always be desirable and in such circumstances a longer chain may be used in position R³ as well as in position R⁴.

Similarly, R¹ and R² may be methyl, propyl or other alkyl if the attendant lowering in oestrogenic potency is not undesirable. It will be observed that R¹, R², R³, and R⁴ may all represent the same alkyl or different alkyls within the range of carbon atoms given for each position of the alkyl groups.

In making the new series of carboxylic acid esters of monoalkyl ethers the general method used is that of acylation of a monoalkyl ether of an alpha, beta dialkylstilboestrol. More specifically, the method is one which comprises the step of replacing the hydrogen of the remaining hydroxyl group of the dialkylstilboestrol monoalkyl ether by a carboxylic acid acyl group.

The esterification of alpha, beta diethyl stilboestrol monoalkyl ethers is effected by heating a solution of the ether in an excess of the chloride or anhydride of the selected acyl, in the presence or absence of a suitable solvent and in the presence or absence of a suitable catalyst.

The materials are maintained in intimate contact with each other for a substantial period of time, the temperature being kept below the boiling point of the selected halide or anhydride, but in any case, not higher than about 100° C. Evaporation is prevented by either closing the vessel tightly or using a reflux condenser equipped with a suitable means for preventing water vapor from coming into contact with the reacting mixture.

After the mixture has reacted under the described conditions, the excess of the esterifying agent is separated by the addition of the reaction mixture to an excess of cold water. Meanwhile the crude ester derivative of the monoether separates usually as a white crystalline solid. The ether-ester derivative is separated, as by filtration and is dissolved in hot alcohol to give a nearly saturated solution. Any undissolved material present is removed by filtration or decantation and the resultant clear solution of the monocarboxylic acid acyl derivative is allowed to cool to cause crystallization. The crystals thus obtained may be further purified by further repetition of the recrystallization operation. Petroleum ether and other suitable solvents may be used.

Detailed examples of the preparation of the monocarboxylic acid acyl derivatives of dialkyl stilboestrol monoalkyl ethers are given below.

The monoalkyl ether of alpha, beta dialkylstilboestrol is dissolved in a mixture of the esterifying agent and pyridine and the mixture heated at a temperature not higher than the boiling point of the esterifying agent used. The compositions used in making typical products of the invention, together with the conditions of the reaction, yields, and the properties of the starting material and end product are given in the following table.

Equivalent results have been obtained with the use of propionic anhydride and benzoyl chloride.

When the reaction is completed the reaction mixture is poured into a large excess of cold water which precipitates the esterified dialkylstilboestrol monomethyl ether, usually in a crystalline condition. The precipitated product is filtered off and the filter cake is washed with cold water. In some cases, as when acetic anhydride is used as the esterifying agent, the esterifying agent, and the acid formed from it, are soluble in water and are washed into the filtrate by this process. In other cases, as when p-bromobenzoyl chloride is used as the esterifying agent, the esterifying agent and the acid formed from it are not soluble in water and are found in the filter cake. In this latter case the filter cake is dissolved in ether and the ether solution is washed with a dilute solution of sodium bicarbonate in water until all of the acid is removed from the ether layer. The ether solution is then dried and the ether evaporated.

In either case the crude monoester of dialkylstilboestrol monomethyl ether, from which the esterifying agent and the acid formed from the esterifying agent have been removed, is purified by dissolving in the minimum quantity of hot alcohol, filtering the solution, and allowing the monoester of the dialkylstilboestrol monomethyl ether to crystallize out as the solution is cooled. The monoesters of dialkylstilboestrol monomethyl ether is then separated by filtration. If necessary the resulting ether-ester product can be further purified by repeating the recrystallization from alcohol, or by recrystallizing it from petroleum ether or other suitable solvents.

The monocarboxylic acid acyl derivatives of alpha, beta-dialkylstilboestrol monoalkyl ethers so prepared show potencies similar to that of the monoethers of alpha, beta-diethylstilboestrol and great differences in potency from the di-ethers. In fact, the dose required of the di-ethers varies from 30 to 100 times the quantity which is adequate for the monocarboxylic acid acyl derivatives of alpha, beta, diethylstilboestrol monoethers.

The monocarboxylic acid acyl derivatives of alpha, beta, dialkylstilboestrol monoethers are not only potent but when administered in physiological doses do not ordinarily cause the undesirable symptoms of nausea and headache, which are characteristic of diethyl-stilboestrol and diesters of diethyl-stilboestrol.

Furthermore, when administering the ether-esters of dialkylstilboestrol hereindescribed, variation of the dose permits control of the duration of estrus. Increased doses prolong the estrus. This is a characteristic property of the monocarboxylic acid acyl derivatives of dialkylstilboestrol monoethers. When administering dialkylstilboestrol or diester derivatives of dialkylstilboestrol, a larger does than necessary to pro-

| Ester derivative | Acetate | Para-brom benzoate | Butyrate |
|---|---|---|---|
| Diethylstilboestrol monomethyl ether, M. P. 118°. | 1 gm. | 2 gr. | 1 gm. |
| Esterifying agent | 3 cc. acetic anhydride. | 1.6 gms. p-brom benzoyl chloride. | 3 c. butyric anhydride. |
| Solvent and catalyst | 5 cc. pyridine. | 10 cc. pyridine. | 5 cc. pyridine. |
| Temperature | 100° C. | 100° C. | 100° C. |
| Time | 1 hr. | 1 hr. | 3 hrs. |
| Yield (crude) | 90–100% | 90–100% | 90–100%. |
| M. P. | 116° C. | 132° C. | 65° C. |
| Oestrogenic activity [1] | 4 to 5 gamma. | | |

[1] Weight required to produce oestrous in ovariectomized rats.

duce estrus only increases the undesirable manifestations of headache and nausea.

The standard method of biological assay for oestrogenic activity of natural sex hormones is used for the determination of the potency of the new derivatives. This test is applied to a number of ovariectomized guinea pigs, mice or rats. Rats were used for the assays reported here. The selected animals were injected with various dilutions of the composition to be assayed and the condition of the animal determined by examination of the vaginal epithelium. An unknown extract or material is said to contain, for example, one hundred rat units per cubic centimeter or per gram if one hundredths of a cubic centimeter or of a gram is just sufficient to produce estrus in 50% of the test animals.

It will be understood that in such animal assays, the accuracy is not as high as in the usual chemical or physical determination. It is conclusive, at any rate, that the effectiveness of the monocarboxylic acid acyl derivatives of the dialkylstilboestrol monoalkyl ethers is many times greater than that of the corresponding di-ethers. Likewise, the observed toxicity of the monoacyl derivatives of the dialkylstilboestrol monoethers herein described is considerably less than that of diethyl-stilboestrol or diester derivatives of diethyl-stilboestrol.

The ester derivatives of the dialkylstilboestrol monoalkyl ethers of the present invention may be identified in the known manner by one skilled in the art. If the compound is suspected to be one of the new mono-ester derivatives of a dialkylstilboestrol monoalkyl ether, it may be purified and its melting point determined for comparison with the known melting points of the monocarboxylic acid acyl derivatives of the dialkylstilboestrol monoethers. If the melting point approximates that for a given monocarboxylic acid acyl derivative of a dialkylstilboestrol monoether, the ether group may be removed and the melting point compared with the corresponding dialkylstilboestrol monoether. Melting points for a number of mono-ester derivatives of dialkylstilboestrol monoethers, and of the monomethyl ether of diethylstilboestrol are given in the above table in form suitable for use for this purpose.

The removal of the acyl group from the monester derivative of the monoalkyl ether, to give the corresponding dialkylstilboestrol monoalkyl ether, for purposes of identification, may be made in conventional manner.

The term "diethylstilboestrol" is used herein to designate alpha, beta-diethyl 4,4'-dihydroxy stilbene unless otherwise specifically stated.

It will be understood that the details given are for the purpose of illustration, not restriction, and that variations within the spirit of the invention are intended to be included in the scope of the appended claims.

What is claimed is:

1. As a new product, a monocarboxylic acid acyl derivative of dialkylstilboestrol monoalkyl ether corresponding to the formula

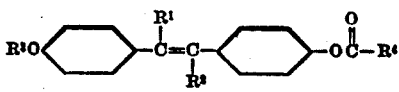

wherein $R^1$ and $R^2$ represent alkyl groups, and $R^3$ and $R^4$ a monovalent alkyl radical.

2. Product according to claim 1, in which $R^3$ and $R^4$ are primary alkyl groups.

3. Product according to claim 1, in which $R^1$ and $R^2$ are ethyl groups.

4. Product according to claim 1, in which $R^3$ is an alkyl radicle containing from 1 to 7 carbon atoms.

5. The process of manufacturing monocarboxylic acid acyl derivatives of dialkylstilboestrol monoalkyl ethers which comprises esterifying a monoalkyl ether of an alpha, beta-dialkylstilboestrol by heating in solution in an excess of an esterifying agent and below the boiling point of the said esterifying agent.

6. Process according to claim 5, in which the esterifying agent is chosen from the group consisting of acetic anhydride, propionic anhydride, benzoyl chloride, p-brombenzoyl chloride, and butyric anhydride.

7. Process of manufacturing the acetate of dialkylstilboestrol monomethyl ether which comprises reacting dialkylstilboestrol monomethyl ether with acetic anhydride at a temperature of 100° C. and for a time period of 1 hour.

8. The process of acetylating alpha, beta-diethylstilboestrol monoalkyl ethers which comprises heating a solution of the monoether of diethylstilboestrol in an excess of a carboxylic acid acylating compound consisting of acetic anhydride and in the presence of pyrdine as a solvent, at a temperature of 100° C. for a time period of 1 hour; adding the reaction mixture to an excess of cold water to effect separation of the excess of acetic anhydride and precipitation of the crude acetyl derivative as a crystalline solid; filtering off the solid product and subjecting same to a series of recrystallizations comprising dissolving same in a hot organic solvent to give a nearly saturated solution; removing undissolved material from the hot solution and cooling the solution to cause crystallization of the purified acetyl compound.

9. Process according to claim 8, in which alcohol is used as the solvent in the recrystallization step.

10. Process according to claim 8, in which petroleum ether is used as the solvent in the recrystallization step.

11. Process according to claim 5, in which the esterification is carried out in a closed vessel.

12. The process of forming monocarboxylic acid acyl derivatives of alpha, beta-diethylstilboestrol monoalkyl ethers which comprises heating a solution of the mono-ether in an excess of a monocarboxylic acid acylating agent having hydrocarbon radicals containing 1 to 7 carbon atoms, and in the presence of a solvent, at a temperature of 100° C. for a time period of one hour; adding the reaction mixture to an excess of cold water to effect separation of the excess of acylating agent and precipitation of the crude carboxyl derivative as a crystalline solid; filtering off the solid product and dissolving same in hot alcohol to give a nearly saturated solution; removing undissolved material from the hot solution and cooling the solution to cause crystallization of the purified ether-ester compound.

BERNARD J. LUDWIG.

CERTIFICATE OF CORRECTION.

Patent No. 2,338,076.  December 28, 1943.

BERNARD J. LUDWIG.

It is hereby certified that error appears in the printed specification of the above numbered patent requiring correction as follows: Page 2, first column, line 45, for "monocarboxylic acid acyl" read --ether-ester--; page 3, first column, line 50, for "monester" read --monoester--; and second column, line 64, claim 12, for "carboxyl" read --ether-ester--; and that the said Letters Patent should be read with this correction therein that the same may conform to the record of the case in the Patent Office.

Signed and sealed this 3rd day of October, A. D. 1944.

Leslie Frazer (Seal)  Acting Commissioner of Patents.